(12) United States Patent
Mattsson et al.

(10) Patent No.: US 12,063,508 B2
(45) Date of Patent: Aug. 13, 2024

(54) METHODS AND APPARATUS FOR DEVICE AUTHENTICATION AND AUTHORISATION

(71) Applicant: Telefonaktiebolaget LM Ericsson (publ), Stockholm (SE)

(72) Inventors: Hans Mattsson, Mölndal (SE); Linus Andersson, Gothenburg (SE); David Del Peral Chico, Getafe (ES); Marcos Caballero Del Dedo, Madrid (ES); Alfonso de Jesus Perez Martinez, Madrid (ES); Miguel Angel Muñoz De La Torre Alonso, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 437 days.

(21) Appl. No.: 17/619,439

(22) PCT Filed: Jul. 24, 2019

(86) PCT No.: PCT/EP2019/069912
§ 371 (c)(1),
(2) Date: Dec. 15, 2021

(87) PCT Pub. No.: WO2020/253973
PCT Pub. Date: Dec. 24, 2020

(65) Prior Publication Data
US 2022/0248228 A1 Aug. 4, 2022

(30) Foreign Application Priority Data
Jun. 21, 2019 (EP) .................................. 19382524

(51) Int. Cl.
*H04W 12/06* (2021.01)
*H04W 12/084* (2021.01)

(52) U.S. Cl.
CPC ......... *H04W 12/084* (2021.01); *H04W 12/06* (2013.01)

(58) Field of Classification Search
CPC .............................. H04W 12/06; H04W 12/08
See application file for complete search history.

(56) References Cited

U.S. PATENT DOCUMENTS

2018/0192390 A1  7/2018  Li et al.
2018/0234351 A1  8/2018  Amento et al.
(Continued)

OTHER PUBLICATIONS

3GPP, "3GPP TS 29.522 V15.2.0", 3rd Generation Partnership Project; Technical Specification Group Core Network and Terminals; 5G System; Network Exposure Function Northbound APIs; Stage 3 (Release 15), Dec. 2018, 1-32.
(Continued)

*Primary Examiner* — Michael T Vu
(74) *Attorney, Agent, or Firm* — Weisberg I.P. Law, P.A.

(57) ABSTRACT

A method and apparatus for device authentication and authorisation, wherein the method comprises: receiving, at an authentication and authorisation node, a device authorisation request comprising identity information for an application executed by a device and a first application specific container containing application specific information; identifying, using the device authorisation request, the application to which the request relates, and checking the authorisation status of the application; if the application is for use, transmitting an authorisation approval, the authorisation approval comprising the first application specific container containing application specific information.

20 Claims, 8 Drawing Sheets

(56) References Cited

U.S. PATENT DOCUMENTS

| | | | |
|---|---|---|---|
| 2019/0297147 A1* | 9/2019 | Drasin | H04L 67/141 |
| 2020/0053080 A1* | 2/2020 | Hamlin | H04W 12/06 |
| 2020/0186519 A1* | 6/2020 | Apthorp | H04W 12/06 |

OTHER PUBLICATIONS

3GPP, "3GPP TS 29.522 V15.3.0", 3rd Generation Partnership Project; Technical Specification Group Core Network and Terminals; 5G System; Network Exposure Function Northbound APIs; Stage 3 (Release 15), Mar. 2019, 1-32.

3GPP, "3GPP TS 29.522 V16.0.0", 3rd Generation Partnership Project; Technical Specification Group Core Network and Terminals; 5G System; Network Exposure Function Northbound APIs; Stage 3 (Release 16), Jun. 2019, 1-43.

* cited by examiner

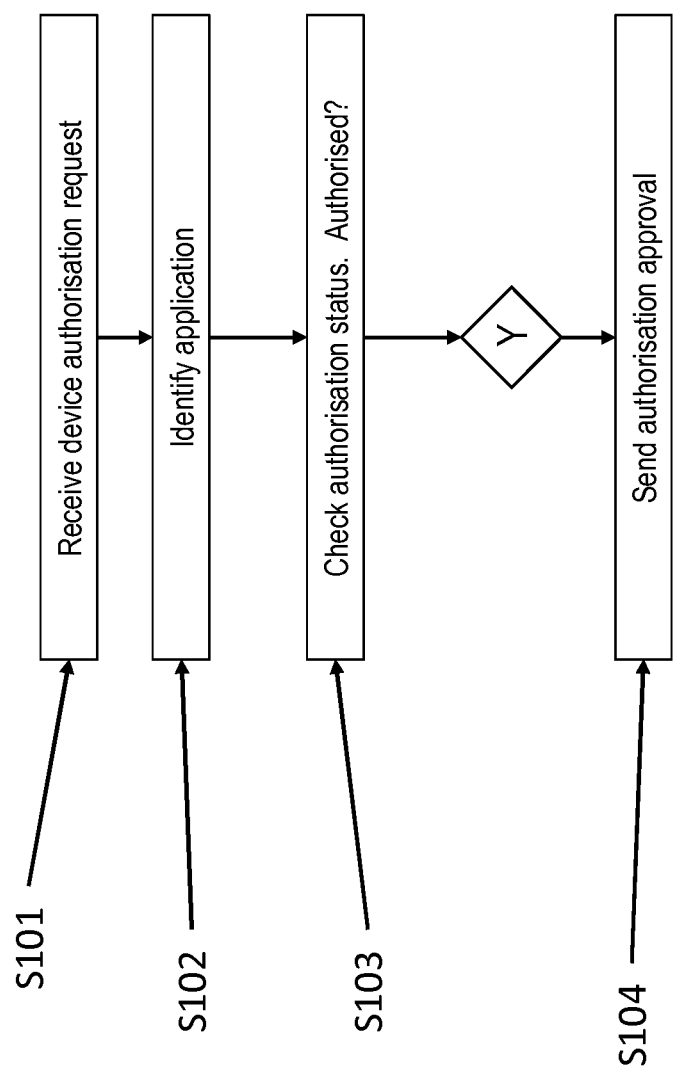

METHODS AND APPARATUS FOR DEVICE AUTHENTICATION AND AUTHORISATION

TECHNICAL FIELD

Embodiments of the present disclosure relate to methods and apparatus in networks, and particularly methods and apparatus for authentication and authorisation of devices in networks, more particularly Internet of Things devices.

BACKGROUND

The term "Internet of Things" (IoT) is used to describe the incorporation of wireless connectivity into a range of everyday devices, such as automobiles and other vehicles, household appliances (fridges, washing machines, cookers, etc.), sensors, and so on. The wireless connectivity is used to enable the IoT devices to send and receive data over a network, often for the purposes of remote monitoring or control of the devices. Remote monitoring and control of devices is of particular value for devices which may move separate from a user, for example, drone devices.

The number and variety of IoT devices are both increasing rapidly, and these trends are expected to continue in the coming years. IoT devices are expected to become increasingly important in a wide variety of different roles. As an example of the use of drones; a delivery company may desire to reduce expenses using drones or remote control vehicles, as drone effected deliveries would typically be less expensive than equivalent deliveries completed by human workers.

Drones may be able to travel continuously in an auto-pilot trip at any time of day. Typically, drones have a SIM Card (as a UE terminal) and communicate their GPS position via a mobile network. Mobile networks play an extremely important role to support this communication; a drone that cannot send its GPS position is a missing drone. As such, the interaction between IoT devices such as drones and mobile networks (for example, $3^{rd}$ Generation Partnership Program, 3GPP, networks such as 4G and 5G networks) is key to the successful operation of the IoT devices. Without reliable location mechanisms, it is possible that drones may not be authorised for use in some jurisdictions.

FIG. 1 shows the 5G reference network architecture as defined by the 3GPP. In FIG. 1, a variety of different network functions are shown. Some of the network functions are discussed in greater detail below.

The Application Function (AF) interacts with the 3GPP Core Network and may be used, for example, to exchange information between a Content Provider and a Network Operator. In this context, the content provider is a user of the network, that routes data traffic through the network via the use of network resources. The network operator is the owner and operator of the network, typically a company that charges content providers for use of network resources.

The Policy Control Function (PCF) supports unified policy framework to govern the network behaviour. As an example of this, the PCF may provide PCC (Policy and Charging Control) rules to the Policy and Charging Enforcement Function, PCEF, that enforces policy and charging decisions according to the provisioned PCC rules.

The PCEF may comprise the Session Management Function (SMF) and the User Plane Function (UPF). The Session Management function (SMF) supports different functionality, specifically the SMF may receive PCC rules from PCF and configure the UPF accordingly. The User Plane Function (UPF) supports handling of user plane traffic based on the rules received from SMF, specifically the UPF may support packet inspection and different enforcement actions (e.g. HTTP header enrichment).

The Network Exposure Function (NEF) acts as an entry point into a network for an external Application Function (AF), such as that of a device, where the device may be an IoT device. The NEF thereby securely exposes network capabilities and events provided by 3GPP network functions to external AFs.

Current interfaces between IoT devices and networks do not provide scaleable mechanisms to authenticate and authorize an IoT device both from network operator and content provider's perspective. This can introduce delays in communications between IoT devices and content providers (via networks). Further issues can result in the transmission of information between devices, network operators and content providers.

3GPP TS 29.522 V15.3.0, a technical report of the $3^{rd}$ Generation Partnership Project available at https://www.3gpp.org/ftp/Specs/archive/29_series/29.522/ as of 13 Jun. 2019, discloses in section 5 Network Exposure Function protocols for Application Program Interfaces (APIs).

SUMMARY

It is an object of the present disclosure to facilitate the transfer of information between devices, content providers and network operators.

Embodiments of the disclosure aim to provide apparatuses and methods that alleviate some or all of the problems identified.

An aspect of an embodiment of the disclosure provides a method for device authentication and authorisation, the method comprising: receiving, at an authentication and authorisation node, a device authorisation request comprising identity information for an application executed by a device and a first application specific container containing application specific information; identifying, using the device authorisation request, the application to which the request relates, and checking the authorisation status of the application; wherein, if the application is authorised for use, the method further comprises transmitting an authorisation approval, the authorisation approval comprising the first application specific container containing application specific information. By receiving and transmitting the application specific container, the method facilitates the transfer of information between devices, content providers and network operators, which can reduce delays in the transfer of information, reduce operating expenses and increase efficiency.

The authorisation approval may be sent to a device server, and the method may further comprise; receiving, at the device server, the authorisation approval; validating the authorisation approval; and sending an acknowledgement comprising a second application specific container to the device. Again, these steps can facilitate the transfer of information. Further where the second application specific container contains an authentication token, this token may subsequently be used to negate the need for device authentication and authorisation on reconnection, thereby increasing the efficiency of the connection process.

The application may be activated at the device, and the authorisation request comprising the first application specific container may be generated at the device, such that the application specific information may be provided and the efficient authentication and authorisation process undertaken.

The checking of the authorisation status of the application may comprise determining subscriber information that indicates whether services to which the device is subscribed support the device authorisation, and the authorisation approval may comprise the subscriber information. Including this information in the authorisation approval can enhance the cooperation between the network operator and the content provider.

A further aspect of an embodiment of the disclosure provides an authentication and authorisation node configured to perform device authentication and authorisation, the authentication and authorisation node comprising processing circuitry and a non-transitory machine-readable medium storing instructions, wherein the authentication and authorisation node is configured to: receive a device authorisation request comprising a first application specific container containing application level identity information for an application executed by a device; identify, using the device authorisation request, the application to which the request relates; check the authorisation status of the application; and if the application is authorised for use, send an authorisation approval, the authorisation approval comprising the first application specific container containing application specific information. A still further aspect of an embodiment of the disclosure provides a network comprising the authentication and authorisation node, and further comprising a device server configured to: receive the authorisation approval; validate the authorisation approval; and send an acknowledgement comprising a second application specific container to the device. A yet further aspect of an embodiment further comprises the device. The authentication and authorisation node, device server and device may provide advantages as discussed above in the context of the respective methods.

BRIEF DESCRIPTION OF DRAWINGS

For a better understanding of the present disclosure, and to show how it may be put into effect, reference will now be made, by way of example only, to the accompanying drawings, in which:

FIGS. 3A and 3B are flowcharts of methods in accordance with aspects of embodiments;

DETAILED DESCRIPTION

Figure 1:
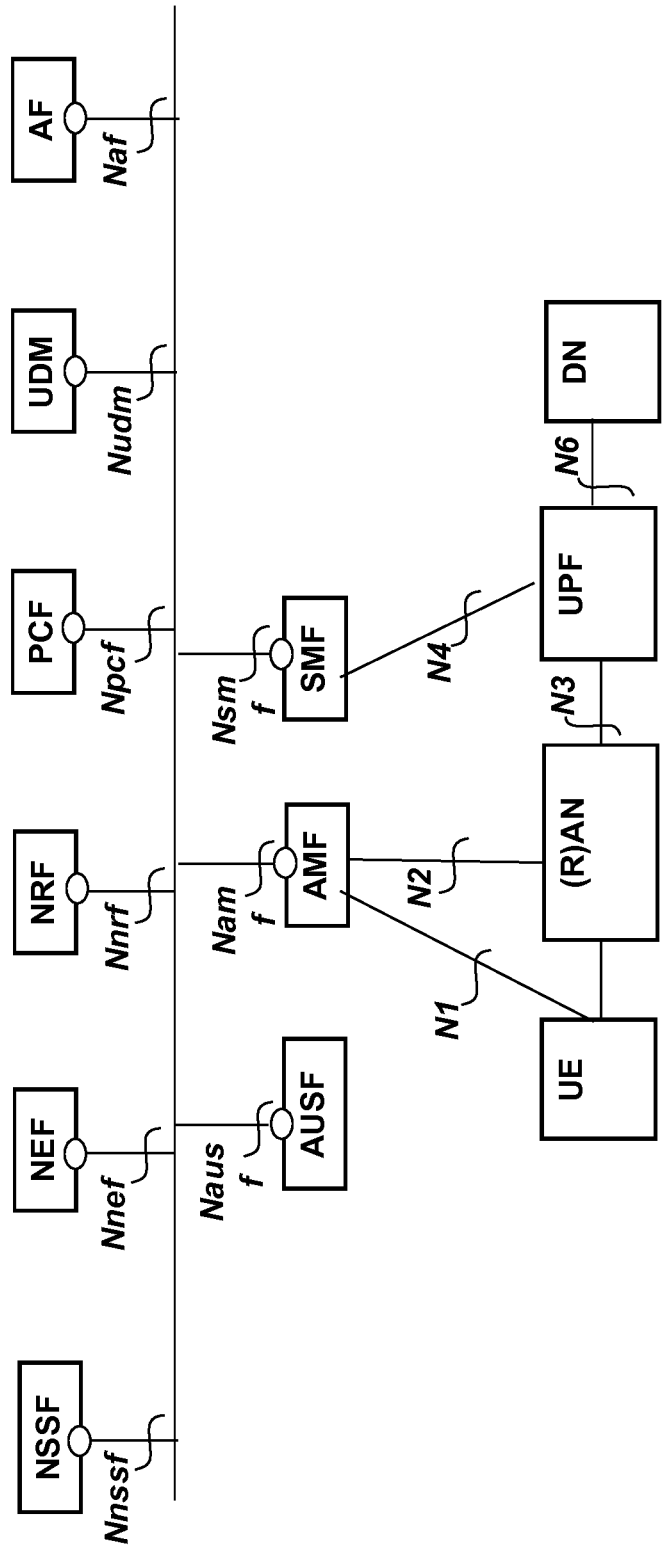
FIG. 1 is a schematic diagram of the 5G reference network architecture as defined by the 3GPP.

The following sets forth specific details, such as particular embodiments for purposes of explanation and not limitation. It will be appreciated by one skilled in the art that other embodiments may be employed apart from these specific details. In some instances, detailed descriptions of well-known methods, nodes, interfaces, circuits, and devices are omitted so as to not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Aspects of embodiments may provide methods and apparatus for facilitating the transfer of information between Network Operators and Content Providers. In particular, aspects of embodiments may provide a new Application Program Interface API which allows Authentication & Authorization for IoT devices (such as drones). The new API may provide various advantages, for example, Network Operators (NO) and Content Providers (CP, such as Drone Management Systems) may take advantage of enhanced collaboration by using an API to support Authentication & Authorization Use Cases for IoT devices. This may facilitate the development of new services by one or both of the NO and CP, potentially in conjunction with one another. Also, operating expenses for the NO in particular may be reduced as a result of the simplification of device authentication and authorisation provided by aspects of embodiments.

Figure 2:
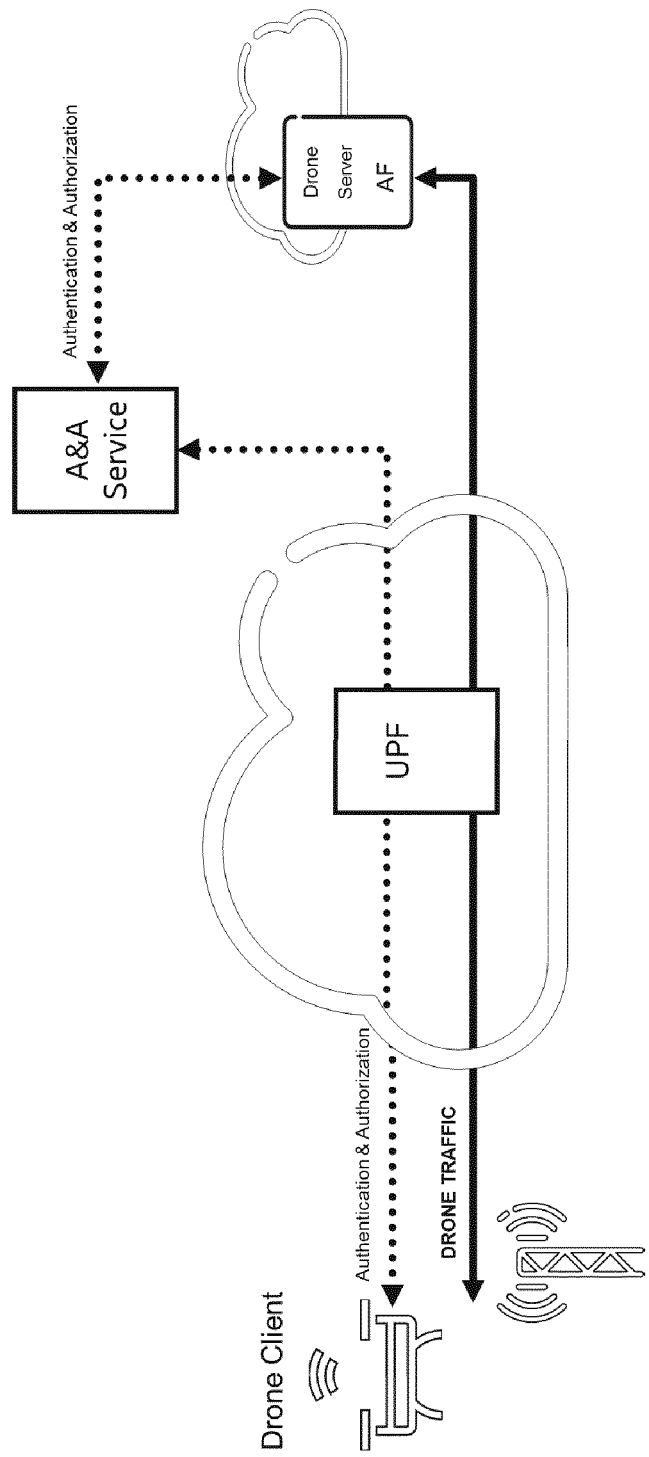
FIG. 2 is a schematic diagram of a network architecture according to an aspect of an embodiment.

FIG. 2 shows a schematic diagram of a network architecture according to an aspect of an embodiment. As shown in FIG. 2, authentication and authorisation information (A&A information) may be passed between the IoT device (drone client) and A&A service (for example, an A&A node) via the UPF. The A&A information may be sent as part of an authorisation request for the IoT device, requesting access to the network for the device. The A&A information may comprise identity information for an application executed by the IoT device, and may also comprise an application specific container containing application specific information. Using the A&A information, the A&A service may identify the application (executed by the IoT device) to which the request relates, and may then verify whether the application is authorised for network access or not. Where it is determined that the application is authorised, an authorisation approval may be transmitted back to the IoT device, where the authorisation approval may again comprise an application specific container containing application specific information.

As shown in FIG. 2, in aspects of embodiments, the A&A information may also be passed between the A&A service and a drone server. The drone server may act to validate the authorisation approval, and send an acknowledgement comprising a further application specific container (that is, a second application specific container) back to the device. This acknowledgement may be sent via the A&A service. Where a further application specific container is sent, this container may be used to send an authentication token, which may subsequently be used by the IoT device to access application services without requiring further full authentication and authorisation.

FIG. 3A is a flowchart of a method for device authentication and authorisation in accordance with an aspect of an embodiment. The method may be performed by an authentication and authorisation node, and may comprise receiving, at the authentication and authorisation node, a device authorisation request (see step S101). As discussed above, the authentication request may be from an IoT device such as a drone, and may comprise identity information for an application executed by the device and a first application specific container containing application specific information. The authentication and authorisation node may be, for example, the authentication and authorisation node of either of FIG. 4A and FIG. 4B. The device authorisation request may be received, via the interfaces 43, by the processor 41 of the authentication and authorisation node 40A shown in FIG. 4A, where the processor 41 may be executing instructions stored in the memory 42. Alternatively, the device authorisation request may be received by the receiver 44 of the A&A node 40B shown in FIG. 4B.

Once received, the authentication request may be used to identify the application, executed by the device, to which the request relates, as shown in step S102 of FIG. 3A. Once identified, the authorisation status of the application may be verified (see step S103). In some aspects of embodiments, the checking of the authorisation status may comprise determining subscriber information that indicates whether services to which the device is subscribed support device authorisation. The identification of the application may be performed by the processor 41 of the authentication and authorisation node 40A shown in FIG. 4A, where the processor 41 may be executing instructions stored in the memory 42. Alternatively, the identification may be performed by the identifier 45 of the A&A node 40B shown in FIG. 4B. Similarly, the authorisation status of the application may be verified by the processor 41 of the authentication and authorisation node 40A shown in FIG. 4A, where the processor 41 may be executing instructions stored in the memory 42. Alternatively, the verification may be performed by the verifier 46 of the A&A node 40B shown in FIG. 4B.

if the application is authorised for use, an authorisation approval may then be transmitted to the IoT device (see step S104). The authorisation approval may comprise the first application specific container containing application specific information. Where subscriber information has been determined (as discussed above), the authorisation approval may comprise this subscriber information. The transmission may be performed by the processor 41 in conjunction with the interfaces 43 of the authentication and authorisation node 40A shown in FIG. 4A, where the processor 41 may be executing instructions stored in the memory 42. Alternatively, the transmission may be performed by the transmitter 47 of the A&A node 40B shown in FIG. 4B.

Figure 3B:
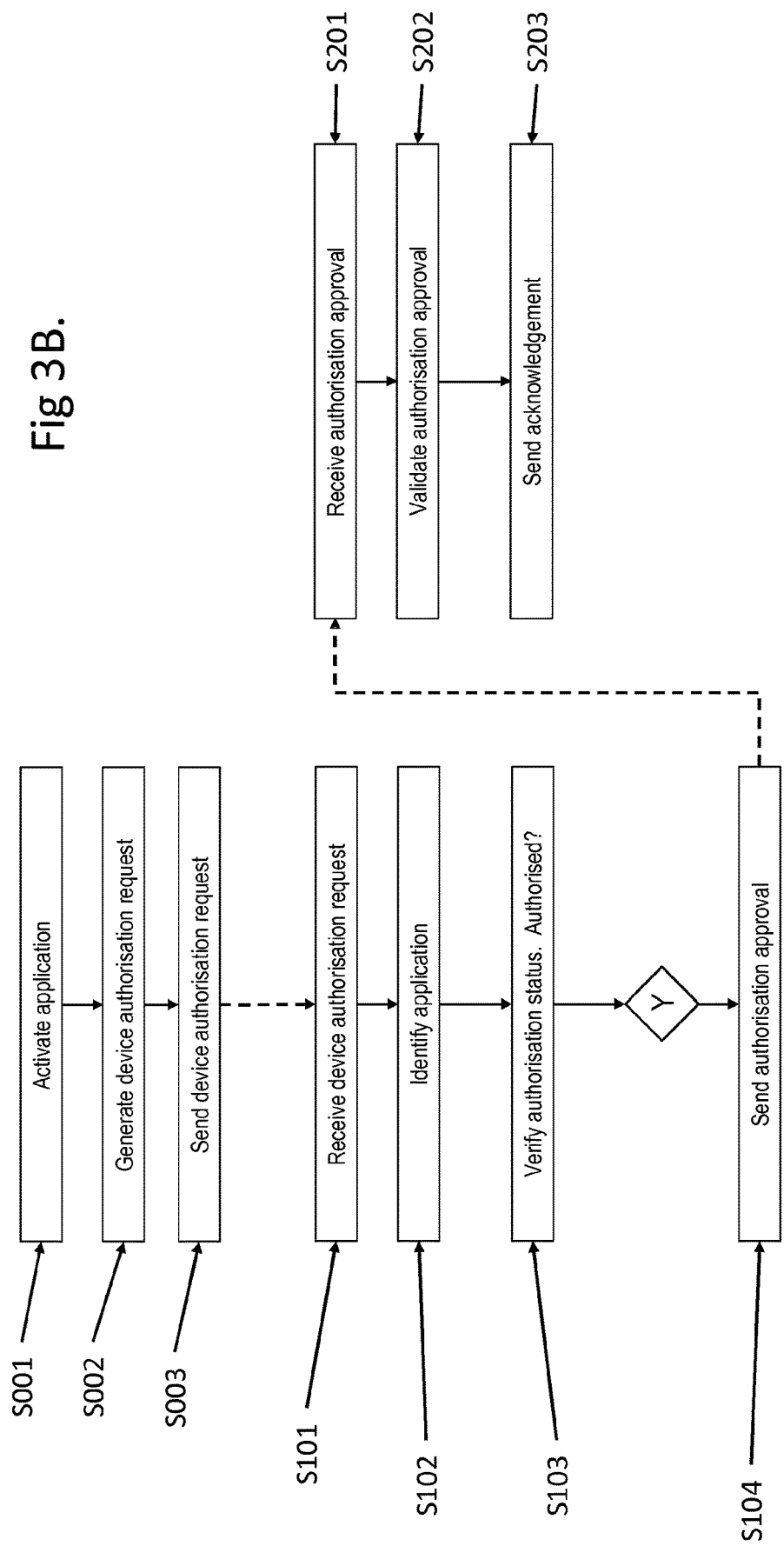
Figure 4A:
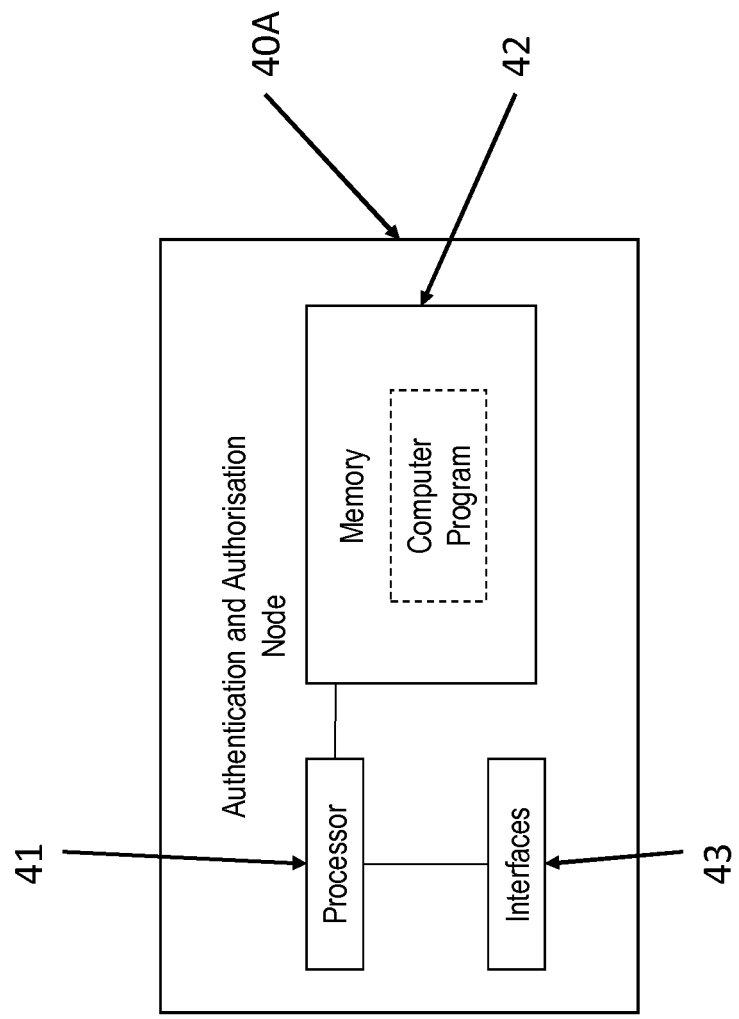
FIGS. 4A and 4B are schematic diagrams of authentication and authorisation nodes in accordance with aspects of embodiments.
Figure 4B:
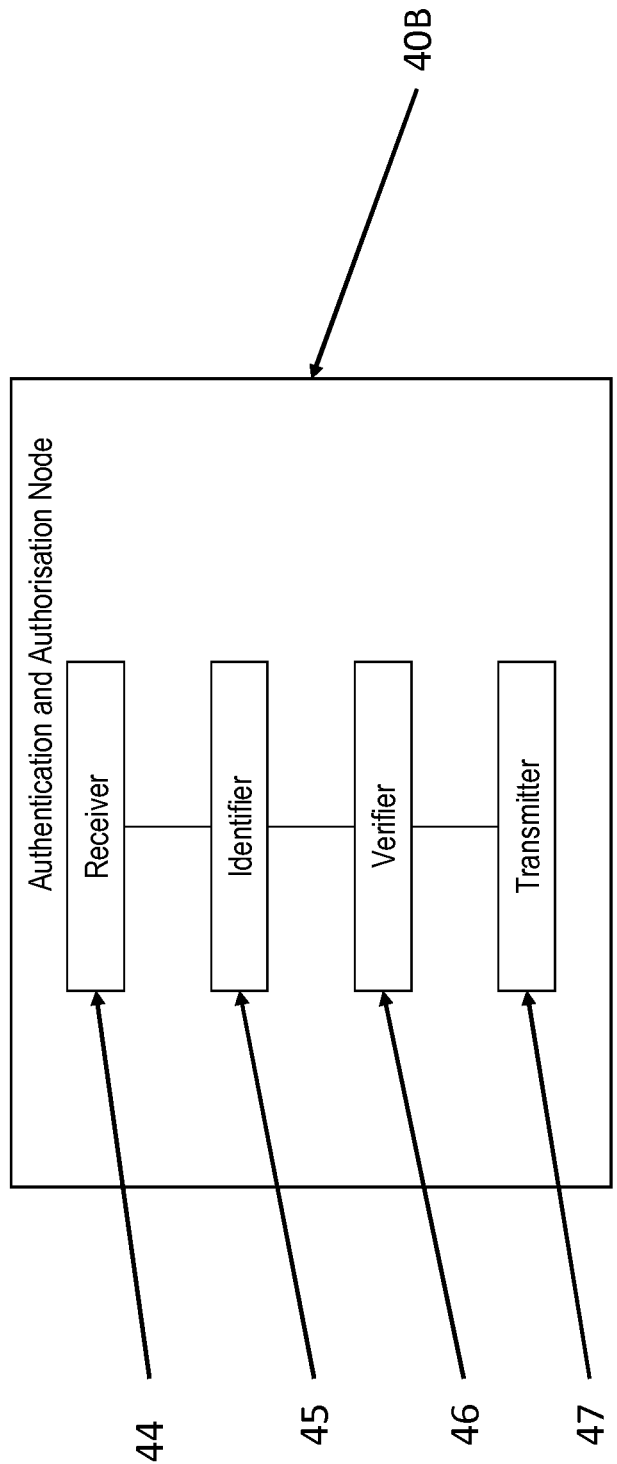

In further aspects of embodiments, one or more additional steps may be performed in the authentication and authorisation method. FIG. 3B shows some additional steps which may be performed in some aspects of embodiments. Some or all of the additional steps may be performed by a further apparatus, such as a device (for example, IoT device) or a device server. In an exemplary aspect of an embodiment, steps S001 to S003 may be performed by an IoT device, and steps S201 to S203 may be performed by a device server. Steps S001 to S003 may be performed before steps S101 to S103, and steps S201 to S203 may be performed after steps S101 to S103.

In step S001, a device such as an IoT device (for example, a drone) may activate an application. The application may require network access in order to operate correctly, for example, the application may provide location information for the device to the operator of the device. Once activated, the application may generate a device authentication request which, as discussed above may comprise an application specific container (see step S002). The IoT device may then send the device authorisation request, as shown in step S003. In some aspects of embodiments, prior to sending the device authorisation request, the IoT device may sends a data transfer session establishment request and, in response to this request, packet detection rules and/or forwarding action rules may be established for the device.

The device authorisation request may be transmitted from the device to the authentication and authorisation node via a user plane function (UPF, as shown in FIG. 2), and the user plane function may enrich the header of the authorisation request with additional information, for example, related to the data transfer session used by the device. This enrichment may provide useful information to the authentication and authorisation node, or to other nodes or components in a network. The enrichment of the header is discussed in greater detail below.

Reception of the authorisation approval comprising a first application specific container may take place at a device server, which may be (for example) a drone server. The reception of the authorisation approval is shown in step S201. When the device server receives the authorisation approval, the device server may then validate the authorisation approval (see step S202), potentially with reference to a further database. If the validation is successful, the device server may then send an acknowledgement (potentially comprising a second application specific container) to the device as shown in step S203. The acknowledgement may be sent directly to the device, or may be sent via the A&A server. If a second application specific container is sent, this container may comprise an authentication token (which may be valid indefinitely, for a certain period of time, or for a certain number of uses), which may be used by the device to bypass the authentication and authorisation process for future accesses.

Figure 5A:
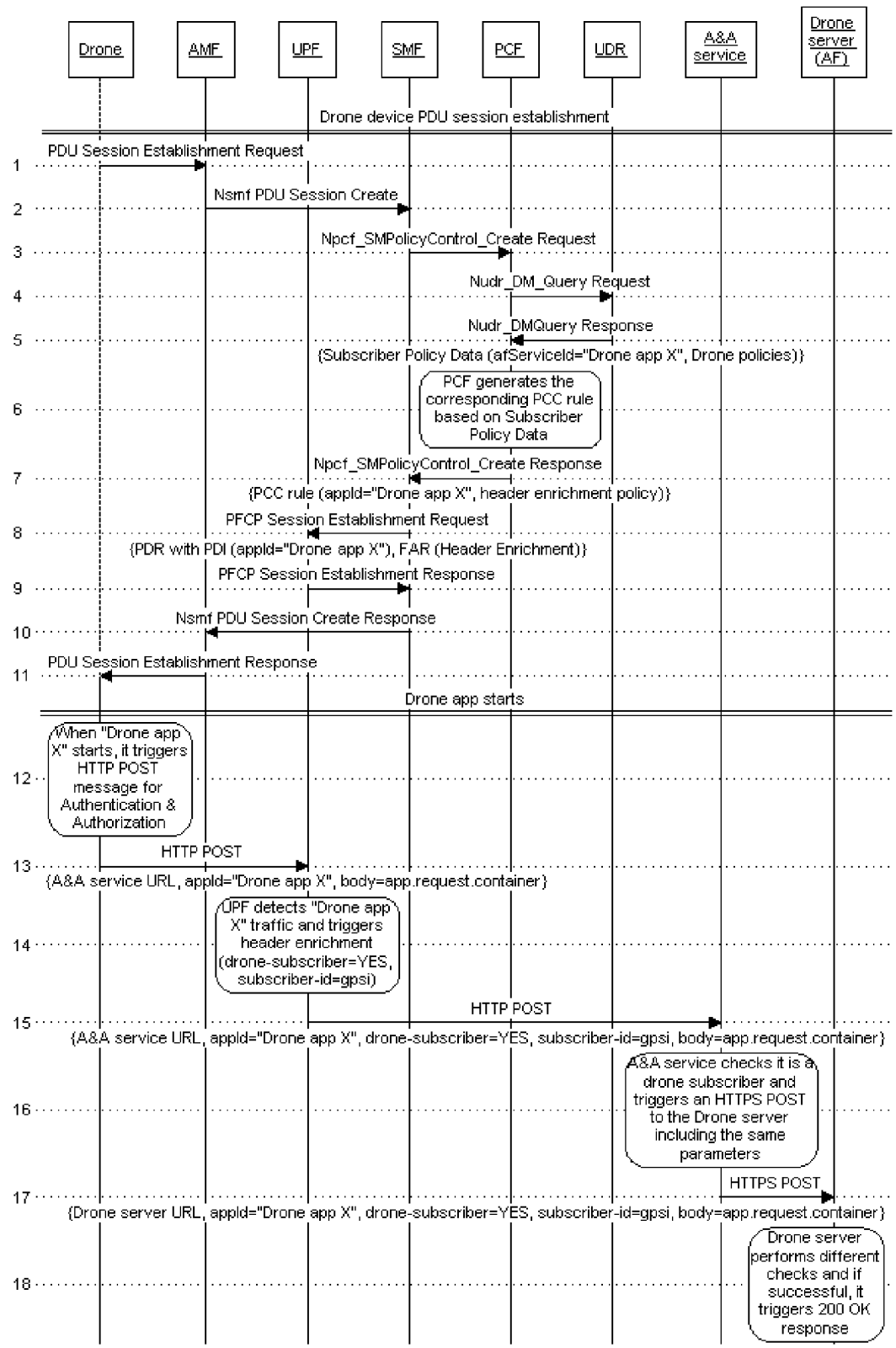
FIGS. 5A and 5B are a signalling diagram for a process including the authentication and authorisation of a device according to an aspect of an embodiment.
Figure 5B:
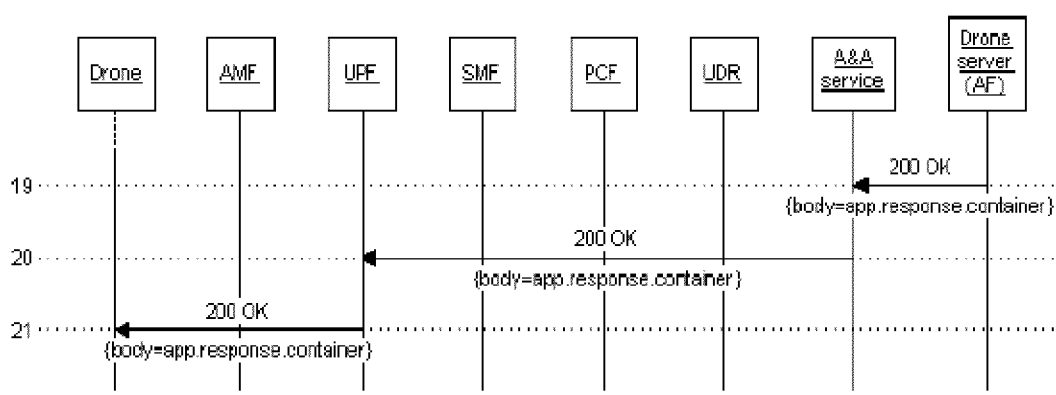

A detailed sequence diagram showing steps which may be performed in an authentication and authorisation process in accordance with aspects of embodiments is shown in FIG. 5. One or more of the steps shown in this figure may be omitted. FIG. 5 also includes additional steps which may be used, for example, to establish a PDU session, but which do not necessarily form part of some aspects of embodiments.

In FIG. 5, the different functions which may be involved in the authentication and authorisation process are indicated across the top of the figure, and the steps that may be performed are numbered down the side of the figure. The functions listed across the top of the figure may be hosted in any suitable physical apparatus. In aspects of embodiments, the functions may be hosted as shown below: the Drone function may be hosted in an IoT device, which may be a drone; the Access and Mobility Management function (AMF) may be hosted in a Control Plane (CP) node of the network; the User Plane Function (UPF) may be hosted in a User Plane (UP) node of the network; the Session Management Function (SMF) may be hosted in the CP node; the Policy Control Function (PCF) may be hosted in a policy node of the network; The User Data Repository (UDR) may be a user database in the network; the Authentication and Authorisation service (A&A) may be hosted in an A&A node; and the Drone Server Application Function (AF) may be hosted in a server of the content provider.

In aspects of embodiments, a UE (that is, a device such as a Drone) may be registered with a network (such as a 4G or 5G network). As part of the registration procedure the UE may been authenticated by the 5G Core Network based on the USIM in the UE and corresponding subscription information stored in the 5G Core Network. As such, the network may contain information relating to the UE, such as device identification information. Information may be stored, for example, in a UDR.

As shown in Steps 1 and 2) of FIG. 5, the UE (Drone) triggers Protocol Data Unit (PDU) session establishment, by means of sending a PDU Session Establishment Request to AMF. AMF selects an SMF to manage the PDU session (the SMF selection function in the AMF selects an SMF instance based on the available SMF instances obtained from NRF or on the configured SMF information in the AMF) and triggers Nsmf PDU Session Create. As part of this procedure the SMF can obtain information about the subscription identity (e.g. Subscription Permanent Subscriber Identifier, SUPI, and/or Global Public Subscription Identifier, GPSI) that was authenticated for the UE during the registration procedure together with other information related to that subscription. That information is stored for the PDU session. For simplicity, all of the signaling messages that may be involved in the PDU Session Establishment procedure are not shown in FIG. 5. Those skilled in the art will be aware of the PDU session establishment procedure, and any suitable PDU session establishment procedure may be used.

In Step 3 the SMF triggers a Npcf_SMPolicyControl_Create Request message to retrieve SM policies for the user's PDU session, which may include the corresponding subscription identifier.

In Step 4 the PCF triggers a Nudr_DM_Query Request message to retrieve the policy data for the user's PDU session and subscription.

In Step 5 the UDR answers with a Nudr_DM_Query Response message including the Subscriber Policy Data. The UDR may check that the device is a drone device and may then return the corresponding drone policies to apply for the given drone application (e.g. Drone app X).

In Step 6 the PCF generates the corresponding PCC rule/s based on Subscriber Policy Data (Drone app X+Drone policies). Then, in Step 7, the PCF triggers a Npcf_SMPolicyControl_Create Response message including the PCC rules to be applied for this user PDU session. In this case, there will be a PCC rule for Drone app X including a header enrichment policy.

In Step 8 the SMF selects the UPF and triggers a PFCP Session Establishment Request message including the corresponding rules, for example, Packet Detection Rules, Forwarding Action Rules, Quality of Service Enforcement Rules, Usage Reporting Rules (PDRs/FARs/QERs/URRs), and so on. In this case, there will be a PDR with Packet Detection Indicators (PDI) of type application with appId="Drone app X", and a FAR including header enrichment policy (to indicate to the server this is a drone device, e.g. drone-subscriber=YES and also the subscriber identity, e.g. subscriber-id=gpsi). This is an example of header enrichment as referred to above; other header enrichments may additionally or alternatively be used.

In Step 9 the UPF stores the PDRs/FARs/QERs/URRs and answers back to SMF with a PFCP Session Establishment Response message. Then, in Steps 10 and 11 the SMF sends, via the AMF, a response back to the UE (drone) indicating that the PDU session has been successfully established and can start to be used for sending packets.

As indicated in FIG. 5, the drone app may be started after the PDU session establishment message has been received by the drone. At this point, the drone has network connectivity. In Steps 12 and 13), the Drone device starts the Drone application (e.g. "Drone app X"). At this time, it triggers HTTP POST request message (eventually HTTPS) requesting authorization of drone usage to the operators A&A service (served via a certain host-name, with the URL of the A&A service). The request includes appId="Drone app X" to indicate the specific application requested to be authorized by the A&A service and also includes an application specific container (app.request.container), including e.g. application level identification info like a drone ID, that will be forwarded to the Drone server. The starting of the application is also shown in S001 of FIG. 3B, the generation of the HTTPS POST request in S002 and the sending of the request in S003.

In Steps 14 and 15 the UPF detects the HTTP POST message sent in Step 13 as "Drone app X" traffic (based on PDR with PDI of type application with app-id="Drone app X"), and triggers an HTTP POST message (including the same information in the original HTTP POST message at Step 13) adding extra information through header enrichment based on the corresponding FAR (including drone-subscriber=YES, subscriber-id=gpsi). In Step 16 the A&A service receives the previous message and verifies it is a drone subscriber (drone-subscriber=YES). It also identifies the subscription (subscriber-id=gpsi). Based on the provided app-id="Drone App X", the A&A service identifies that the request relates to a specific Drone application and checks in the subscriber record whether it allows that specific Drone application to be used. The receiving of the request is also shown in S101, the identification of the application in S102 and the verification of authorisation status in S103 (Y).

In Step 17) assuming the checks are successful, the A&A service, based on the appId, looks up the corresponding Drone server application URL and triggers a HTTPS POST request towards the Drone server (see also S104), including an indication about the used mobile operator and an indication that the subscription allows drone-service. Additionally, it forwards the subscriber identity and the application specific information (app.request.container). Then, in Steps 18 and 19, the Drone server receives the HTTPS POST request and validates it based on the provided information (mobile operator identifier, indication on that drone application ("Drone App X") is allowed by the subscription and application-level drone identity info) that the drone can be allowed to connect to the drone server. If so, the drone server triggers a success acknowledgement, such as an HTTP response code 200 OK, to A&A server acknowledging the request including an application specific container (app.response.container) to be returned to the client application. This container may e.g. include a token to be included for authentication reasons in succeeding application content interactions. The receiving of the message from the A&A service is also shown in S201, the validation in S202 and the sending of the acknowledgement in S203.

In Steps 20 and 21 the A&A service receives the success acknowledgement (from Step 19) and triggers another success acknowledgement, such as an HTTP response code 200 OK, to the original HTTP request from the drone application client and includes the received application specific container (app.response.container). This response is returned to the drone application client (through UPF) which then continues with the startup procedure towards the drone server. The authentication token included in the container may be used for authentication and authorization purpose towards the drone server and potentially also other content services.

Although the example of FIG. 5 is discussed in the context of a 5G network architecture, an analogous procedure may be performed in a 4G network architecture by replacing: the AF with a Service Capability Server/Application Server (SCS/AS); the PCF with a Policy and Charging Rules Function (PCRF); the SMF with a Packet Gateway (PGW) Control plane (PGW-C) or Traffic Detection Function (TDF) Control plane (TDF-C), and the UPF with a PGW User plane (PGW-U) or TDF User plane (TDF-U).

It will be understood that the detailed examples outlined above are merely examples. According to embodiments herein, the steps may be presented in a different order to that described herein. Furthermore, additional steps may be incorporated in the method that are not explicitly recited above. For the avoidance of doubt, the scope of protection is defined by the claims.

The invention claimed is:

1. A method for device authentication and authorisation, the method comprising:
   receiving, at an authentication and authorisation node, a device authorisation request comprising identity information for an application executed by a device and a first application-specific container containing application-specific information;
   identifying, using the device authorisation request, the application to which the device authorisation request relates, and checking an authorisation status of the application; and
   if the application is authorised for use, transmitting an authorisation approval, the authorisation approval comprising the first application-specific container containing application-specific information.

2. The method of claim 1, wherein the authorisation approval is sent to a device server, and wherein the method further comprises:
   receiving, at the device server, the authorisation approval;
   validating the authorisation approval; and
   sending an acknowledgement comprising a second application-specific container to the device.

3. The method of claim 2, wherein the acknowledgement is sent by the device server to the device via the authentication and authorisation node.

4. The method of claim 1, wherein the second application-specific container contains an authentication token.

5. The method of claim 1, further comprising activating the application at the device and generating the device authorisation request comprising the first application-specific container.

6. The method of claim 5, wherein the device authorisation request is transmitted from the device to the authentication and authorisation node via a user plane function, and wherein the user plane function enriches the header of the authorisation request with additional information related to a data transfer session used by the device.

7. The method of claim 5, wherein, prior to sending the device authorisation request, the device sends a data transfer session establishment request and, in response to the data transfer session establishment request, packet detection rules and/or forwarding action rules are established for the device.

8. The method of claim 1, wherein the checking further comprises determining subscriber information that indicates whether services to which the device is subscribed support device authorization requested by the device authorisation request.

9. The method of claim 8, wherein the authorisation approval comprises the subscriber information.

10. The method of claim 1, wherein the device is an Internet of Things device.

11. The method of claim 10, wherein the authorisation approval is sent to a device server, wherein the Internet of Things device is a drone, and wherein the device server is a drone server.

12. An authentication and authorisation node configured to perform device authentication and authorisation, the authentication and authorisation node comprising processing circuitry and a non-transitory machine-readable medium storing instructions whereby the authentication and authorisation node is configured to:
   receive a device authorisation request comprising a first application-specific container containing application-level identity information for an application executed by a device and a first application-specific container containing application-specific information;
   identify, using the device authorisation request, the application to which the device authorisation request relates;
   check an authorisation status of the application; and
   if the application is authorised for use, send an authorisation approval, the authorisation approval comprising the first application-specific container containing application specific information.

13. An authentication and authorisation system in a network, the authentication and authorisation system comprising:
   an authentication and authorisation node, the authentication and authorisation node comprising processing circuitry and a non-transitory machine-readable medium storing instructions whereby the authentication and authorisation node is configured to:
      receive a device authorisation request comprising a first application-specific container containing application-level identity information for an application executed by a device and a first application-specific container containing application-specific information;
      identify, using the device authorisation request, the application to which the device authorisation request relates;
      check an authorisation status of the application; and
      if the application is authorised for use, send an authorisation approval, the authorisation approval comprising the first application-specific container containing application specific information; and
   a device server comprising processing circuitry and a non-transitory machine-readable medium storing instructions whereby the device server is configured to:
      receive the authorisation approval;
      validate the authorisation approval; and
      send an acknowledgement comprising a second application-specific container to the device.

14. The system of claim 13, wherein the acknowledgement is sent by the device server to the device via the authentication and authorisation node.

15. The system of claim 13, wherein the second application-specific container contains an authentication token.

16. The system of claim 13, further comprising the device, wherein the device comprises processing circuitry and a non-transitory machine-readable medium storing instructions whereby the device is configured to:
   activate the application; and
   generate the device authorisation request comprising the first application-specific container.

17. The system of claim 16, wherein the device is configured to transmit the device authorisation request to the authentication and authorisation node via a user plane function, wherein the user plane function enriches the header of the authorisation request with additional information related to a data transfer session used by the device.

18. The system of claim 17, wherein the device is further configured, prior to sending the device authorisation request, to send a data transfer session establishment request, wherein packet detection rules and/or forwarding action rules are established in the system for the device in response to the device authorisation request.

19. The system of claim 13, wherein, when checking the authorisation status of the application, the authentication and authorisation node is further configured to determine subscriber information that indicates whether services to which the device is subscribed support device authorization requested by the device authorization request.

20. The system of claim 19, wherein the authorisation approval comprises the subscriber information.

\* \* \* \* \*